(12) United States Patent
Jiang et al.

(10) Patent No.: US 11,762,098 B2
(45) Date of Patent: Sep. 19, 2023

(54) LASER RADAR FOR METEOROLOGICAL OBSERVATION

(71) Applicant: Shaanxi University of Technology, Hanzhong (CN)

(72) Inventors: Yuan Jiang, Hanzhong (CN); Chao Lu, Hanzhong (CN); Rui Wei, Hanzhong (CN)

(73) Assignee: Shaanxi University of Technology, Hanzhong (CN)

( * ) Notice: Subject to any disclaimer, the term of this patent is extended or adjusted under 35 U.S.C. 154(b) by 0 days.

(21) Appl. No.: 18/149,120

(22) Filed: Jan. 2, 2023

(65) Prior Publication Data
US 2023/0258814 A1    Aug. 17, 2023

Related U.S. Application Data

(63) Continuation of application No. PCT/CN2022/076570, filed on Feb. 17, 2022.

(51) Int. Cl.
| | |
|---|---|
| *G01C 3/08* | (2006.01) |
| *G01S 17/95* | (2006.01) |
| *G01S 7/481* | (2006.01) |
| *G01W 1/02* | (2006.01) |

(52) U.S. Cl.
CPC ............. *G01S 17/95* (2013.01); *G01S 7/4811* (2013.01); *G01W 1/02* (2013.01)

(58) Field of Classification Search
None
See application file for complete search history.

(56) References Cited

U.S. PATENT DOCUMENTS

2022/0026207 A1* 1/2022 Yuasa .................. G01S 7/4815

FOREIGN PATENT DOCUMENTS

| CN | 113721222 | A | | 11/2001 | | |
|---|---|---|---|---|---|---|
| CN | 109163177 | A | | 1/2019 | | |
| CN | 109782301 | A | | 5/2019 | | |
| CN | 110794380 | A | | 2/2020 | | |
| CN | 110824501 | A | | 2/2020 | | |
| CN | 115405830 | A | * | 11/2022 | ............. | Y02E 10/72 |
| EP | 3660451 | A1 | * | 6/2020 | ............. | G01C 15/08 |
| HK | 2000134016 | A | | 5/2000 | | |

* cited by examiner

*Primary Examiner* — Mark Hellner
(74) *Attorney, Agent, or Firm* — Nitin Kaushik

(57) ABSTRACT

The present disclosure discloses a laser radar for meteorological observation, and specifically relates to the field of meteorology. The laser radar comprises a base. According to the present disclosure, air pressure at the bottom of 301 is increased by injecting gas into the interior of 202, so that the 301 falls off from 201, and the disassembly between the stable seat and the connecting sleeve plates is realized; with regard to the disassembly process of the connecting sleeve plates and the base, the magnetic pole of a positioning electromagnet is changed mainly by switching the current direction of an external coil of the positioning electromagnet, so that the positioning electromagnet is separated from the locking magnet, thereby facilitating the detachment of the base and the connecting sleeve plates in combination with the linkage component, and the disassembly process of the whole device.

8 Claims, 7 Drawing Sheets

1: laser emitting component
2: information processing component
3: excitation source
4: laser
5: laser beam controller
6: information receiver
7: information converter
8: photoelectric converter
9: scanning system
10: display component

LASER RADAR FOR METEOROLOGICAL OBSERVATION

CROSS-REFERENCE TO RELATED APPLICATIONS

The application claims priority to Chinese patent application No. PCT/CN2022/076570, filed on Feb. 17, 2022, the entire contents of which are incorporated herein by reference.

TECHNICAL FIELD

The present disclosure relates to the technical field of meteorology, and more particularly to a laser radar for meteorological observation.

BACKGROUND

By transmitting and receiving a laser beam, the laser radar analyzes the turn-back time of the laser beam after the laser beam meets a detection target, calculates the relative distance between the detection target and the location of the laser radar, and collects the three-dimensional coordinates, reflectivity and other information of a large number of dense points on the surface of the detection target to reconstruct a three-dimensional model of the detection target.

Under the condition of coaxial rotation, there are the following main ways for communication between devices on a radar rotor and other fixed devices.
1. A slip ring is used for realizing coaxial data transmission. For example, in a mechanical rotary laser radar, a stator of the slip ring is connected with a stator of the laser radar, at the input end, a signal is transmitted to a rotating electric brush slip ring connector and then the signal is output at the output end of the connector. A rotor of the slip ring is connected with a rotor of the laser radar, and during rotation, an electric signal is transmitted through a signal channel on the slip ring. The main disadvantage of this method is that when the slip ring is used for realizing coaxial data transmission, the slip ring inevitably has the problem of wearing, easily undergoes frictional heating, and is short in service life.
2. An electromagnetic induction coil is used for realizing coaxial data transmission. The main disadvantage of this method is that when the electromagnetic induction coil is used for realizing coaxial data transmission, the coil generates electromagnetic radiation, which will affect other electromagnetic-sensitive devices. Moreover, in order to realize the transmission of multiple data lines, it is necessary to consider the electromagnetic shielding between the lines, which will lead to more complicated signal transmission.

SUMMARY

In order to overcome the above defects of the prior art, the embodiment of the present disclosure provides a laser radar for meteorological observation. Air pressure at the bottom of the sleeve 301 is increased by injecting gas into the interior of the passage 202, so that the sleeve 301 falls off from the recess 201, and the disassembly between the stable seat and the connecting sleeve plates is realized; with regard to the disassembly process of the connecting sleeve plates and the base, the magnetic pole of a positioning electromagnet is changed mainly by switching the current direction of an external coil of the positioning electromagnet, so that the positioning electromagnet is separated from the locking magnet, thereby facilitating the detachment of the base and the connecting sleeve plates in combination with the linkage component, and the disassembly process of the whole device to solve the problem proposed in the background.

To achieve the above purpose, the present disclosure provides the following technical scheme: A laser radar for meteorological observation, comprising a base, wherein a stable seat is fixedly arranged on the top of the base; connecting sleeve plates are arranged on the top of the stable seat; a shell is arranged on the tops of the connecting sleeve plates; a power board is fixedly arranged on the bottom surface of the inner cavity of the base; a clamping slotted plate is fixedly arranged on the top of the power board; a connecting inserted plate is clamped on the top of the clamping slotted plate; the exterior of the connecting inserted plate is fixedly sleeved with a fixing sleeve plate; transverse plates are fixedly arranged on left and right sides of the fixing sleeve plate; the interior of the transverse plate is fixedly sleeved with a locking magnet and a linkage component; a positioning electromagnet located directly below the locking magnet is fixedly arranged on the top of the fixing sleeve plate; the top of the positioning electromagnet is in contact with the bottom of the locking magnet; the linkage component comprises a bottom rod; the top of the bottom rod is movably sleeved with a sleeve rod; an inner rod is fixedly arranged on the bottom of the inner cavity of the sleeve rod; the bottom of the inner rod is movably sleeved with the top of the bottom rod;

which is matched with the bottom of the connecting sleeve plate is formed in the top surface of the stable seat; the bottom of the connecting sleeve plate is fixedly sleeved with; the edge of the is frictionally connected with the inner wall of the; the top of the connecting inserted plate extends to the interior of the connecting sleeve plate and is fixedly provided with a bottom frame; the top of the bottom frame extends to the interior of the shell and is fixedly provided with a rotor radar; the exterior of the rotor radar is fixedly sleeved with a transverse plate; a dust removal box is fixedly arranged inside the transverse plate; an inner frame is fixedly arranged inside the bottom frame; a main shaft is fixedly arranged inside the inner frame; a big input end of the main shaft is electrically connected with the output end of the connecting inserted plate; an auxiliary shaft is fixedly arranged on the top of the main shaft; the top of the auxiliary shaft extends to the exterior of the rotor radar and is fixedly provided with a signal receiving and processing end; a wireless receiving coil located inside the rotor radar is fixedly arranged on the outer wall of the main shaft; a signal transmitting frame and a signal receiving end are fixedly arranged on the front of the shell; and the laser radar comprises a laser emitting component; the output end of the laser radar is in telecommunication connection with an information processing component, the output end of which is in telecommunication connection with a scanning system; and the output end of the scanning system is electrically connected with a display component.

In a preferred implementation mode, the exterior of the inner rod is movably sleeved with a balance spring; the upper and lower ends of the balance spring are fixedly connected with the top surface of the bottom rod and the bottom surface of the inner cavity of the sleeve rod respectively; and the bottom rod is composed of two detachable rods clamped to each other.

In a preferred implementation mode, communicated with the is formed inside the stable seat; and a pressure relief hole communicated with the is formed in the front of the stable seat.

In a preferred implementation mode, the dust removal box comprises a box body; openings are formed in the upper and lower surfaces of the box body; and filter screens are fixedly arranged on the inner walls of the openings.

In a preferred implementation mode, two negative pressure holes are formed in the inner wall of the shell and are respectively located on the upper and lower sides of the transverse plate.

In a preferred implementation mode, the laser emitting component comprises an excitation source, the output end of which is in telecommunication connection with a laser, and the laser is electrically connected with a laser beam controller.

In a preferred implementation mode, the information processing component comprises an information receiver, the output end of which is electrically connected with an information converter and a photoelectric converter.

In a preferred implementation mode, the input end of the positioning electromagnet is in telecommunication connection with the output end of the power board, and an initial magnetic pole on the top of the positioning electromagnet is different from a magnetic pole at the bottom of the locking magnet.

the present disclosure has the following technical effects and advantages that 1. the rotor radar is arranged to match with the main shaft and the auxiliary shaft, so that the volume of the laser radar can be reduced, the device integration level of the laser radar is improved, the space on the main shaft can be further saved, and the space utilization rate is increased;
2. air pressure at the bottom of the sleeve 301 is increased by injecting gas into the interior of the passage 202, so that the sleeve 301 falls off from the recess 201, and the disassembly between the stable seat and the connecting sleeve plates is realized; with regard to the disassembly process of the connecting sleeve plates and the base, the magnetic pole of the positioning electromagnet is changed mainly by switching the current direction of the external coil of the positioning electromagnet, so that the positioning electromagnet is separated from the locking magnet, thereby facilitating the detachment of the base and the connecting sleeve plates in combination with the linkage component, and the disassembly process of the whole device; and
3. gas is introduced into the two negative pressure holes 14 in turns, dust is driven into the dust removal box by the gas flow, and thus, the dust removal process is realized; and the negative pressure holes and the openings on the surface of the stable seat are in a sealed state during operation, which ensures that the interior of the shell is not affected by dust.

Figure 1:
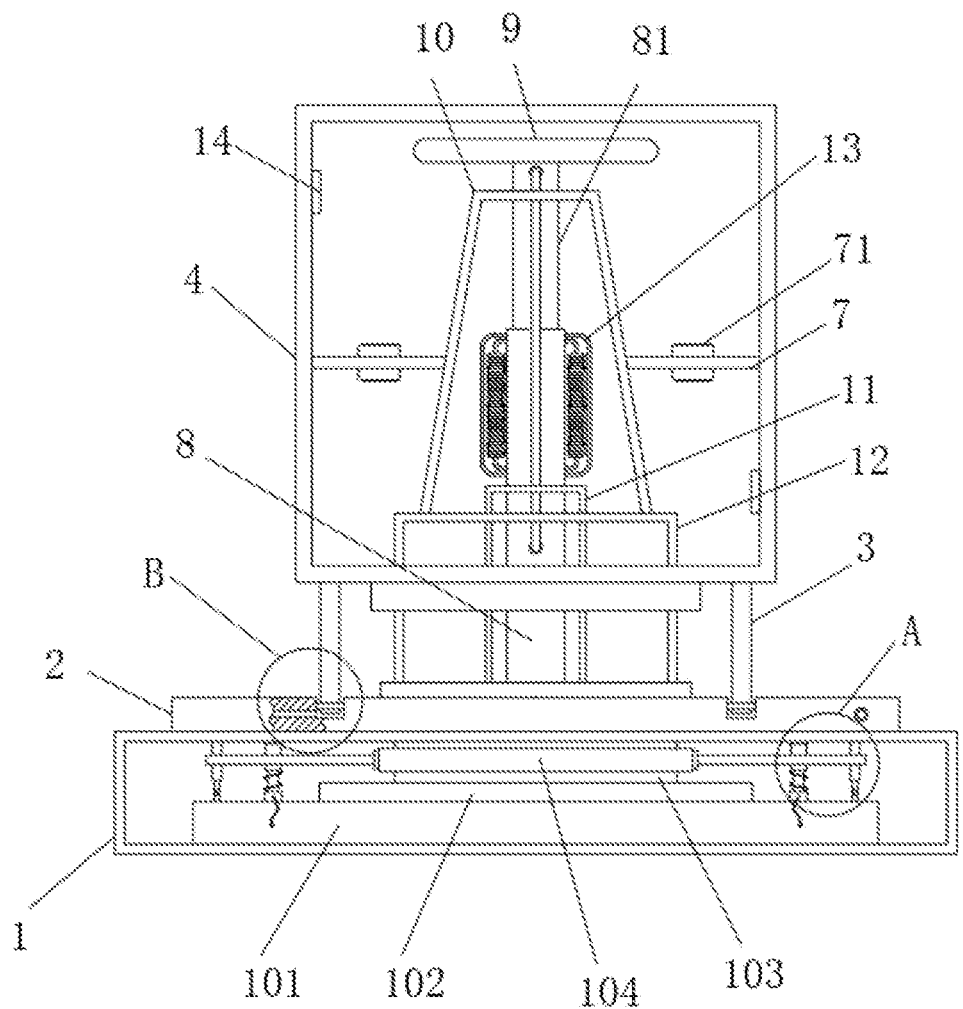
FIG. 1 is a schematic diagram of the overall structure of the present disclosure.

Reference numerals in drawings: 1. base; 101. power board; 102. clamping slotted plate; 103. connecting inserted plate; 104. fixing sleeve plate; 105. transverse plate; 2. stable seat; 3. connecting sleeve plate; 4. shell; 5. positioning electromagnet; 51. locking magnet; 6. linkage component; 61. bottom rod; 62. sleeve rod; 63. inner rod; 64. balance spring; 7. transverse plate; 71. dust removal box; 711. box body; 712. opening; 713. filter screen; 8. main shaft; 81. auxiliary shaft; 9. signal receiving and processing end; 10. rotor radar; 11. inner frame; 12. bottom frame; 13. wireless receiving coil; 14. negative pressure hole; 15. signal transmitting frame; and 16. signal receiving end.

DETAILED DESCRIPTION OF THE EMBODIMENTS

The technical solutions in embodiments of the present disclosure will be described clearly and completely hereinafter with reference to the drawings in the embodiments of the present disclosure. Obviously, the described embodiments are only a part of embodiments of the present disclosure and are not all embodiments. Based on the embodiments of the present disclosure, all other embodiments obtained by a person of ordinary skill in the art without involving any inventive effort all fall within the scope of the present disclosure.

Figure 2:
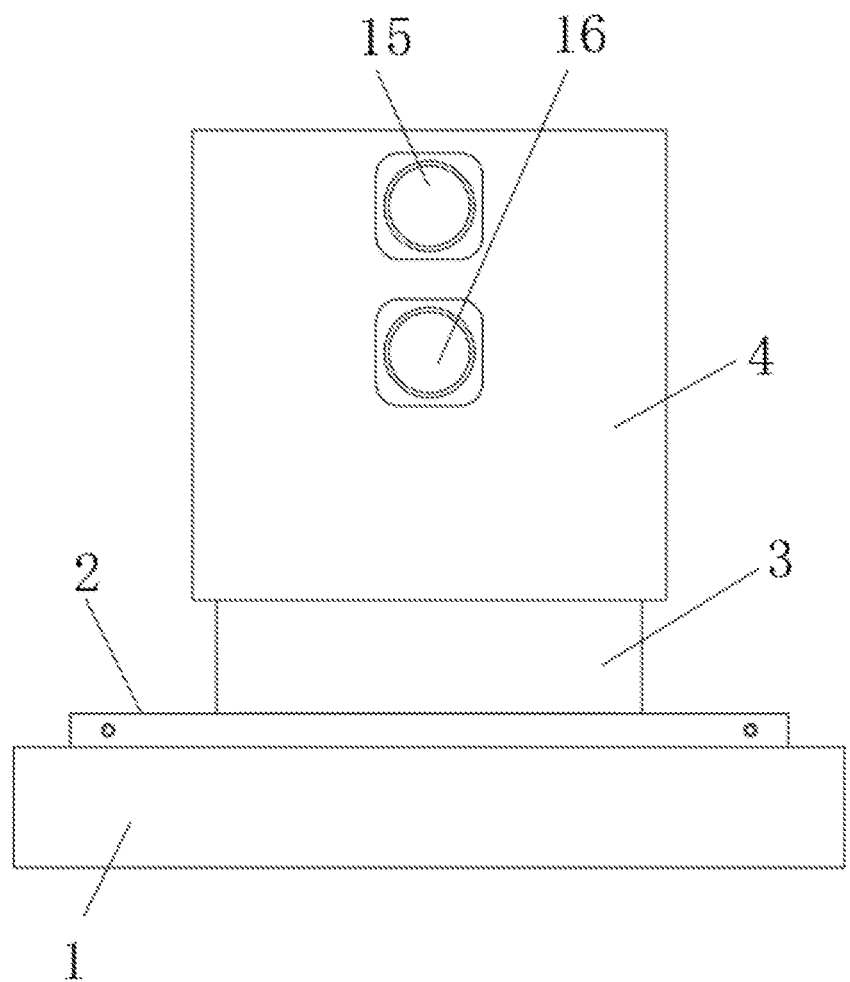
FIG. 2 is a schematic diagram of the exterior structure in FIG. 1 of the present disclosure.
Figure 3:
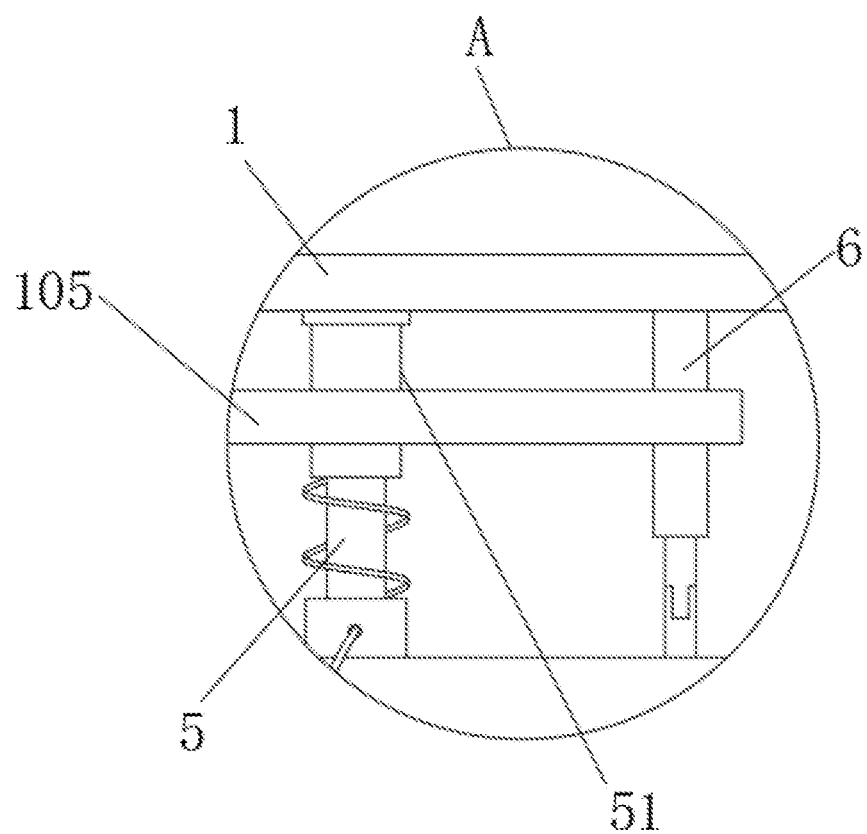
FIG. 3 is a schematic diagram of a structure A in FIG. 1 of the present disclosure.
Figure 4:
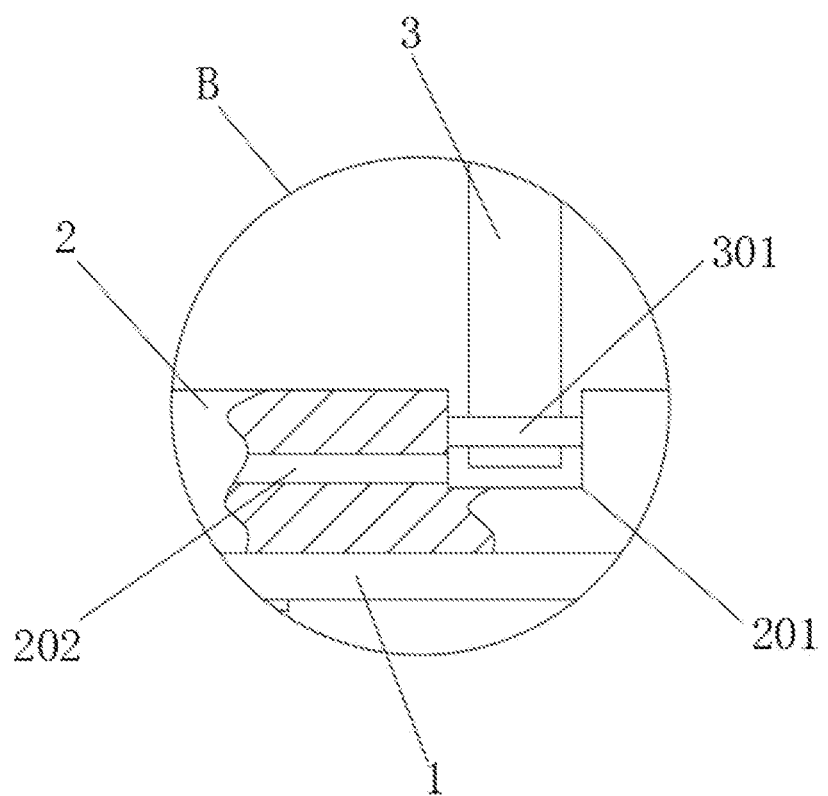
FIG. 4 is a schematic diagram of a structure B in FIG. 1 of the present disclosure.
Figure 5:
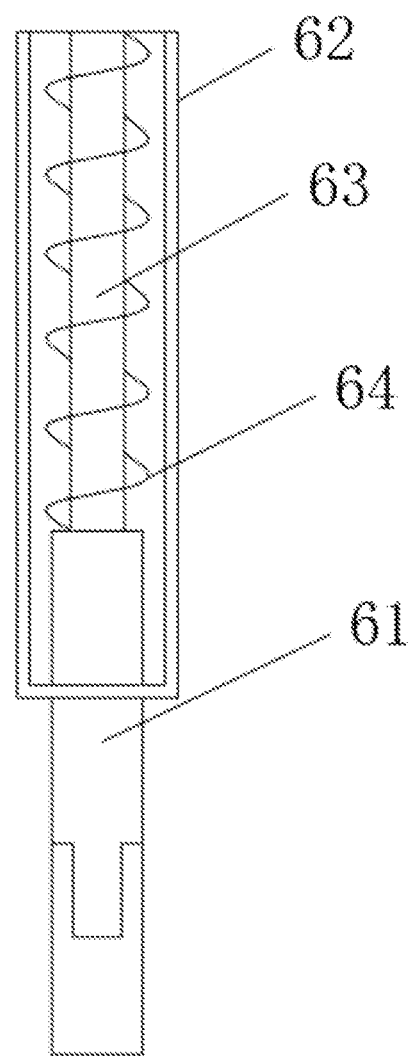
FIG. 5 is a structural schematic diagram of a linkage component of the present disclosure.
Figure 6:
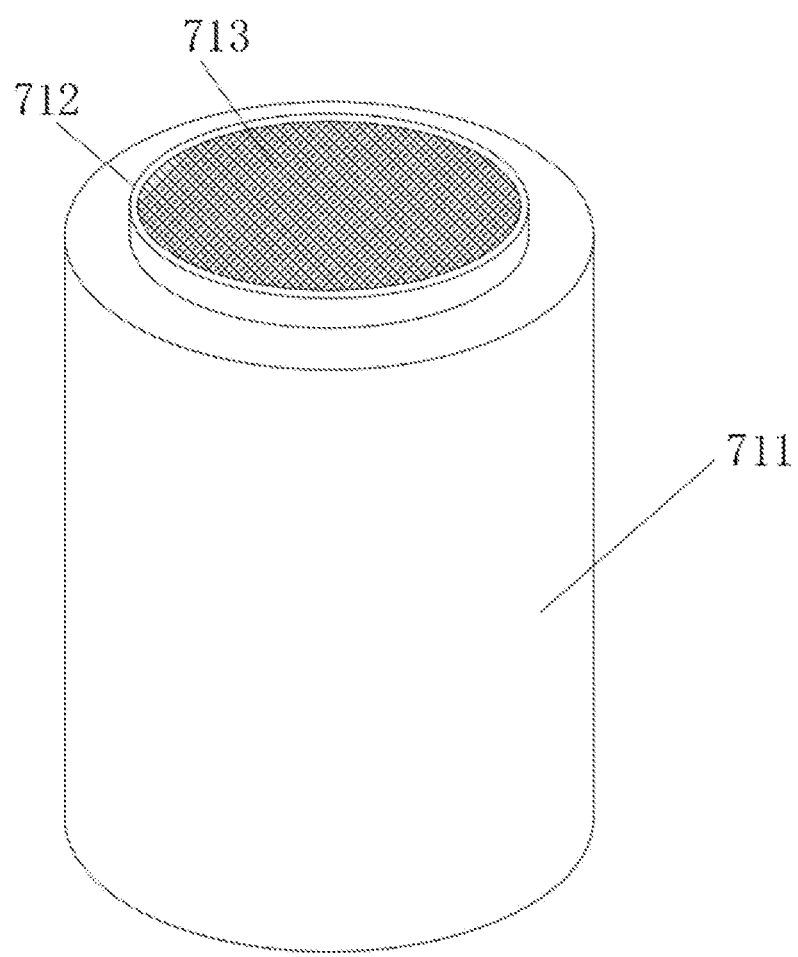
FIG. 6 is a structural schematic diagram of a dust removal box of the present disclosure.
Figure 7:
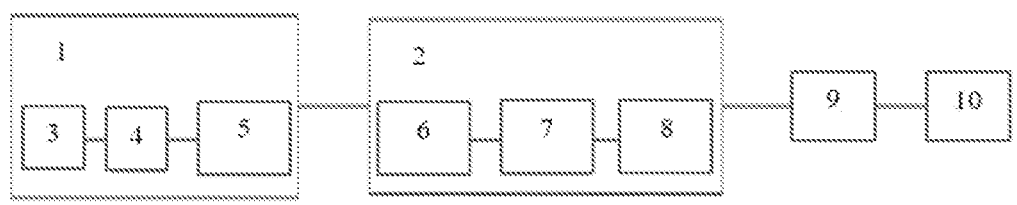
FIG. 7 is a system block diagram of the present disclosure.

A laser radar for meteorological observation as shown in FIG. 1 to FIG. 7 includes a base 1. A stable seat 2 is fixedly arranged on the top of the base 1. Connecting sleeve plates 3 are arranged on the top of the stable seat 2. A shell 4 is arranged on the tops of the connecting sleeve plates 3. A power board 101 is fixedly arranged on the bottom surface of the inner cavity of the base 1. A clamping slotted plate 102 is fixedly arranged on the top of the power board 101. A connecting inserted plate 103 is clamped on the top of the clamping slotted plate 102. The exterior of the connecting inserted plate 103 is fixedly sleeved with a fixing sleeve plate 104. Transverse plates 105 are fixedly arranged on the left and right sides of the fixing sleeve plate 104. The interior of the transverse plate 105 is fixedly sleeved with a locking magnet 51 and a linkage component 6. A positioning electromagnet 5 located directly below the locking magnet 51 is fixedly arranged on the top of the fixing sleeve plate 104. The top of the positioning electromagnet 5 is in contact with the bottom of the locking magnet 51. The linkage component 6 includes a bottom rod 61. The top of the bottom rod 61 is movably sleeved with a sleeve rod 62. An inner rod 63 is fixedly arranged on the bottom of the inner cavity of the sleeve rod 62. The bottom of the inner rod 63 is movably sleeved with the top of the bottom rod 61.

A recess 201 which is matched with the bottom of the connecting sleeve plate 3 is formed in the top surface of the stable seat 2. The bottom of the connecting sleeve plate 3 is fixedly sleeved with a sleeve 301. The edge of the sleeve 301 is frictionally connected with the inner wall of the recess 201. The top of the connecting inserted plate 103 extends to the interiors of the connecting sleeve plates 3 and is fixedly provided with a bottom frame 12. The top of the bottom frame 12 extends to the interior of the shell 4 and is fixedly provided with a rotor radar 10. Gas is introduced into two negative pressure holes 14 in turns, dust is driven into the dust removal box 71 by airflow, and thus the dust removal process is realized, wherein the negative pressure holes 14 and openings on the surface of the stable seat 2 are in a sealed state during operation, which ensures that the interior of the shell 4 is not affected by dust. The exterior of the rotor radar 10 is fixedly sleeved with a transverse plate 7. A dust removal box 71 is fixedly arranged inside the transverse plate 7. An inner frame 11 is fixedly arranged inside the bottom frame 12. A main shaft 8 is fixedly arranged inside the inner frame 11. A big input end of the main shaft 8 is electrically connected with the output end of the connecting inserted plate 103. An auxiliary shaft 81 is fixedly arranged on the top of the main shaft 8. The top of the auxiliary shaft 81 extends to the exterior of the rotor radar 10 and is fixedly provided with a signal receiving and processing end 9. A wireless receiving coil 13 located inside the rotor radar 10 is fixedly arranged on the outer wall of the main shaft 8. A signal transmitting frame 15 and a signal receiving end 16 are fixedly arranged on the front of the shell 4.

The laser radar includes a laser emitting component. The output end of the laser radar is in telecommunication connection with an information processing component, the output end of which is in telecommunication connection with a scanning system; and the output end of the scanning system is electrically connected with a display component.

According to the specific implementation mode, the rotor radar 10 is arranged to match with the main shaft 8 and the auxiliary shaft 81, so that the volume of the laser radar can be reduced, the device integration level of the laser radar is improved, the space on the main shaft can be further saved, and the space utilization rate is increased.

The exterior of the inner rod 63 is movably sleeved with a balance spring 64. The upper and lower ends of the balance spring 64 are fixedly connected with the top surface of the bottom rod 61 and the bottom surface of the inner cavity of the sleeve rod 62 respectively. The bottom rod 61 is composed of two detachable rods clamped to each other. The passage 202 communicated with the recess 201 is formed inside the stable seat 2. A pressure relief hole communicated with the passage 202 is formed in the front of the stable seat 2. The dust removal box 71 includes a box body 711. Openings 712 are formed in the upper and lower surfaces of the box body 711. Filter screens 713 are fixedly arranged on the inner walls of the openings 712. Two negative pressure holes 14 are formed in the inner wall of the shell 4 and are respectively located on the upper and lower sides of the transverse plate 7. The laser emitting component includes an excitation source, the output end of which is in telecommunication connection with a laser. The laser is electrically connected with a laser beam controller. The information processing component includes an information receiver, the output end of which is electrically connected with an information converter and a photoelectric converter. The input end of the positioning electromagnet 5 is in telecommunication connection with the output end of the power board 101. An initial magnetic pole on the top of the positioning electromagnet 5 is different from a magnetic pole at the bottom of the locking magnet 51.

According to the specific implementation mode, air pressure at the bottom of the sleeve 301 is increased by injecting gas into the interior of the passage 202, so that the sleeve 301 falls off from the recess 201, and the disassembly between the stable seat 2 and the connecting sleeve plates 3 is realized; with regard to the disassembly process of the connecting sleeve plates 3 and the base 1, the magnetic pole of the positioning electromagnet 5 is changed mainly by switching the current direction of an external coil of the positioning electromagnet 5, so that the positioning electromagnet 5 is separated from the locking magnet 51, thereby facilitating the detachment of the base 1 and the connecting sleeve plates 3 in combination with the linkage component 6, and the disassembly process of the whole device.

The working principle of the present disclosure is as follows:

the present disclosure has the technical advantages of simple arrangement of the whole structure, small occupied space, and convenience to disassemble as a whole, so the working principle of the present disclosure lies in multiple disassembly processes and the dustproof control inside the shell 4;

with regard to the disassembly process of the stable seat 2 and the connecting sleeve plates 3, air pressure at the bottom of the sleeve 301 is increased mainly by injecting gas into the interior of the passage 202 in advance, so that the sleeve 301 falls off from the recess 201, and the disassembly between the stable seat 2 and the connecting sleeve plates 3 is realized; and with regard to the disassembly process of the connecting sleeve plates 3 and the base 1, the magnetic pole of the positioning electromagnet 5 is changed mainly by switching the current direction of the external coil of the positioning electromagnet 5, so that the positioning electromagnet 5 is separated from the locking magnet 51, thereby facilitating the detachment of the base 1 and the connecting sleeve plates 3 in combination with the linkage component 6.

With regard to the dust removal inside the shell 4, gas is mainly introduced into the two negative pressure holes 14 in turns, dust is driven into the dust removal box 71 by the gas flow, and thus, the dust removal process is realized; and the negative pressure holes 14 and the openings on the surface of the stable seat 2 are in a sealed state during operation.

What is claimed is:

1. A laser radar for meteorological observation, comprising a base (1), wherein a stable seat (2) is fixedly arranged on the top of the base (1); connecting sleeve plates (3) are arranged on the top of the stable seat (2); a shell (4) is arranged on the tops of the connecting sleeve plates (3); a power board (101) is fixedly arranged on the bottom surface of the inner cavity of the base (1); a clamping slotted plate (102) is fixedly arranged on the top of the power board (101); a connecting inserted plate (103) is clamped on the top of the clamping slotted plate (102); the exterior of the connecting inserted plate (103) is fixedly sleeved with a fixing sleeve plate (104); transverse plates (105) are fixedly arranged on left and right sides of the fixing sleeve plate (104); the interior of the transverse plate (105) is fixedly sleeved with a locking magnet (51) and a linkage component (6); a positioning electromagnet (5) located directly below the locking magnet (51) is fixedly arranged on the top of the fixing sleeve plate (104); the top of the positioning electromagnet (5) is in contact with the bottom of the locking magnet (51); the linkage component (6) comprises a bottom rod (61); the top of the bottom rod (61) is movably sleeved with a sleeve rod (62); an inner rod (63) is fixedly arranged on the bottom of the inner cavity of the sleeve rod (62); the bottom of the inner rod (63) is movably sleeved with the top of the bottom rod (61);

a recess (201) which is matched with the bottom of the connecting sleeve plate (3) is formed in the top surface of the stable seat (2); the bottom of the connecting sleeve plate (3) is fixedly sleeved with a sleeve (301); the edge of the sleeve (301) is frictionally connected with the inner wall of the recess (201); the top of the connecting inserted plate (103) extends to the interior of the connecting sleeve plate (3) and is fixedly provided with a bottom frame (12); the top of the bottom frame (12) extends to the interior of the shell (4) and is fixedly provided with a rotor radar (10); the exterior of the rotor radar (10) is fixedly sleeved with a transverse plate (7); a dust removal box (71) is fixedly arranged inside the transverse plate (7); an inner frame (11) is fixedly arranged inside the bottom frame (12); a main shaft (8) is fixedly arranged inside the inner frame (11); a big input end of the main shaft (8) is electrically connected with the output end of the connecting inserted plate (103); an auxiliary shaft (81) is fixedly arranged on the top of the main shaft (8); the top of the auxiliary shaft (81) extends to the exterior of the rotor radar (10) and is fixedly provided with a signal receiving and processing end (9); a wireless receiving coil (13) located inside the rotor radar (10) is fixedly arranged on the outer wall of the main shaft (8); a signal transmitting frame (15) and a signal receiving end (16) are fixedly arranged on the front of the shell (4); and the laser radar comprises a laser emitting component; the output end of the laser radar is in telecommunication connection with an information processing component, the output end of which is in telecommunication connection with a scanning system; and the output end of the scanning system is electrically connected with a display component.

2. The laser radar for meteorological observation according to claim 1, wherein the exterior of the inner rod (63) is movably sleeved with a balance spring (64); the upper and lower ends of the balance spring (64) are fixedly connected with the top surface of the bottom rod (61) and the bottom surface of the inner cavity of the sleeve rod (62) respectively; and the bottom rod (61) is composed of two detachable rods clamped to each other.

3. The laser radar for meteorological observation according to claim 1, wherein a passage (202) communicated with the recess (201) is formed inside the stable seat (2); and a pressure relief hole communicated with the passage (202) is formed in the front of the stable seat (2).

4. The laser radar for meteorological observation according to claim 1, wherein the dust removal box (71) comprises a box body (711); openings (712) are formed in the upper and lower surfaces of the box body (711); and filter screens (713) are fixedly arranged on the inner walls of the openings (712).

5. The laser radar for meteorological observation according to claim 1, wherein two negative pressure holes (14) are formed in the inner wall of the shell (4) and are respectively located on the upper and lower sides of the transverse plate (7).

6. The laser radar for meteorological observation according to claim 1, wherein the laser emitting component comprises an excitation source, the output end of which is in telecommunication connection with a laser, and the laser is electrically connected with a laser beam controller.

7. The laser radar for meteorological observation according to claim 1, wherein the information processing component comprises an information receiver, the output end of which is electrically connected with an information converter and a photoelectric converter.

8. The laser radar for meteorological observation according to claim 1, wherein the input end of the positioning electromagnet (5) is in telecommunication connection with the output end of the power board (101), and an initial magnetic pole on the top of the positioning electromagnet (5) is different from a magnetic pole at the bottom of the locking magnet (51).

\* \* \* \* \*